US006389592B1

(12) United States Patent
Ayres et al.

(10) Patent No.: US 6,389,592 B1
(45) Date of Patent: May 14, 2002

(54) METHOD FOR DEPLOYMENT OF INCREMENTAL VERSIONS OF APPLICATIONS

(75) Inventors: Malcolm David Ayres, Romsey; Gordon Douglas Hutchison, Eastleigh, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,125

(22) Filed: Sep. 2, 1999

(30) Foreign Application Priority Data

Sep. 12, 1998 (GB) .............................................. 9819841

(51) Int. Cl.[7] .............................................. G06F 9/445
(52) U.S. Cl. ...................... 717/172; 717/170; 717/137; 717/141; 717/177; 707/203; 707/10
(58) Field of Search ......................... 717/11, 2–5, 108, 717/122, 137, 141, 168, 170, 172, 173, 174, 177, 178; 709/246, 203; 707/203, 204, 104, 101, 511, 540, 10, 104.1

(56) References Cited

U.S. PATENT DOCUMENTS

| | | | | |
|---|---|---|---|---|
| 5,287,448 A | | 2/1994 | Nicol et al. ................. 345/337 |
| 5,574,906 A | * | 11/1996 | Morris ........................... 707/1 |
| 5,623,661 A | * | 4/1997 | Hon ................................ 707/1 |
| 5,634,052 A | * | 5/1997 | Morris ........................... 707/1 |
| 5,715,454 A | * | 2/1998 | Smith ......................... 707/203 |
| 5,721,907 A | | 2/1998 | Pyne ........................... 395/610 |
| 5,729,743 A | * | 3/1998 | Squibb ....................... 707/203 |
| 5,752,039 A | * | 5/1998 | Tanimura ..................... 717/11 |
| 5,832,520 A | * | 11/1998 | Miller ......................... 707/203 |
| 6,018,747 A | * | 1/2000 | Burns et al. ............... 707/203 |
| 6,026,237 A | * | 2/2000 | Berry et al. .................. 717/4 |
| 6,052,531 A | * | 4/2000 | Waldin, Jr. et al. .......... 717/11 |
| 6,072,953 A | * | 6/2000 | Cohen et al. ................ 717/10 |
| 6,230,316 B1 | * | 5/2001 | Nachenberg ................. 717/5 |

FOREIGN PATENT DOCUMENTS

GB   2 281 990   3/1995

OTHER PUBLICATIONS

Reuter et al., "Distributed Revision Control Via the World Wide Web," Proc. Sixth Int'l. Workshop on Software Config. Management, Berlin, Germany, 10 pages, Mar. 1996.*
Hunt et al., "Distributed Configuration Management via Java and the World Wide Web," Proc. Seventh Int'l. Workshop on Software Config. Management, No. 1235 Lecture Notes in Computer Science, pp. 161–174, 1997.*
Burns & Long, "In–Place Reconstruction of Delta Compressed Files," Proc. of Symposium on Principles of Distributed Computing, pp. 267–275, <URL:http//citeseer.nj.nec.com/122952.html>, 1998.*

* cited by examiner

Primary Examiner—Tuan Q. Dam
(74) Attorney, Agent, or Firm—Jerry W. Herndon

(57) ABSTRACT

A method for updating a first version of installed application files to a second version is disclosed. The method comprises the steps of: responsive to receiving a delta file defining the changes between a file in the first version and a corresponding file in the second version, transforming said first version of the file into a first transformed image comprising a series of records. The changes contained in the delta file are then applied to selected records of the first transformed image to generate a transformed image of the second version. The transformation on the transformed image of said second version is then reversed to generate the second version of said file on said client computer.

8 Claims, 2 Drawing Sheets

```
Compiled from spin.java
synchronized class spin extends java.lang.Object
    /* ACC_SUPER bit set */
{
    void lookAtDate();
    spin();
}

Method void lookAtDate()
    0 iconst_0
    1 istore_1
    2 goto 8
    5 iinc 1 1
    8 iload_1
    9 bipush 8
    11 if_icmplt 5
    14 return Method spin()
    0 aload_0
    1 invokespecial #3 <Method java.lang.Object()>
    4 return
```

15c
9 bipush 10

```
class spin
{
  void lookAtDate()
    {
      int i;
      // Date format 05/07/98
      for( i=0; i < 8 ; i++ )
        {
            ;      // empty body
        }
    }
}
```

Figure 1

```
class spin
{
  void lookAtDate()
    {
      int i;
      // Date format 05/07/1998
      for( i=0; i < 10 ; i++ )
        {
            ;      // empty body
        }
    }
}
```

Figure 3

Compiled from spin.java
synchronized class spin extends java.lang.Object
    /* ACC_SUPER bit set */
{
    void lookAtDate();
    spin();
}

Method void lookAtDate()
    0 iconst_0
    1 istore_1
    2 goto 8
    5 iinc 1 1
    8 iload_1
    9 bipush 8
    11 if_icmplt 5
    14 return Method spin()
    0 aload_0
    1 invokespecial #3 <Method java.lang.Object()>
    4 return

Figure 2

15c
    9 bipush 10

Figure 4

METHOD FOR DEPLOYMENT OF INCREMENTAL VERSIONS OF APPLICATIONS

FIELD OF THE INVENTION

The present invention relates to a method and component for deployment of incremental versions of applications. The method relates in particular to transferring Java class files across a network with greatly reduced data transfer.

BACKGROUND OF THE INVENTION

Distributing only updates or patches for applications is common practice within the software industry. The benefits of only transmitting application files that have been updated, rather than an entire new version of an application are clear.

Prior art products available in this area include DRP from Marimba Inc. and WebDAV from Microsoft Corporation. These products, however, concentrate on changes at the file level, i.e. the products check a previous version of an application against the current version and if a file has changed, it needs to be transmitted, if not then transmission is not required. It is then common, to further reduce the amount of information transmitted, for groups of changed files to be bundled together and compressed into for example a ZIP file or self-extracting executable file before distribution. Class files for Internet applications can be bundled into Java Jar or Microsoft Cab (Cabinet) files for decompression before execution at a client computer.

Client computers running Java applications downloaded from web servers across the Internet, typically keep Java applet classes in a local cache. It is sometimes necessary to update the cache to ensure the client is operating with the most recent version of the classes. Class files, by comparison to conventional application files, for example for a Word Processor or Spreadsheet, are relatively small and even minor updates to Java applications could effect most of the classes. Thus, file based products such as the ones mentioned above provide little performance benefit to the user by only downloading changed files.

The present invention allows software version migration updates to be downloaded to a client computer with a greatly reduced amount of data transfer from the code server to the client.

DISCLOSURE OF THE INVENTION

Accordingly, the present invention provides a method for updating a first version of installed application files to a second version, said method comprising the steps of: responsive to receiving a delta file defining the changes between a file in said first version and a corresponding file in said second version, transforming said first version of said file into a first transformed image comprising a series of records; applying the changes contained in said delta file to selected records of said first transformed image to generate a transformed image of said second version; and reversing the transformation on the transformed image of said second version to generate said second version of said file on said client computer.

The invention further provides a software component as claimed in claim 6.

Whereas prior art techniques chunked updates at a whole class level when most version to version migrations involve a small percentage of change in the code base, the method according to the invention makes optimum use of already installed application objects on the client computer thus greatly reducing the amount of data necessary to download or transfer.

The downloaded data is the minimum necessary delta file between the two class versions down to, for example, the Java Virtual Machine opcode level—this is likely to be much smaller than previous compression mechanisms and provides a useful improvement in download time/bandwidth use especially with the emergence of non-trivial Internet applications (eg. Component Broker Java Objects, Enterprise Java Beans.)

The present invention also allows the free shipment or download of software updates to customers who already possess licensed versions of the software without requiring licence verification or any special mechanism in the target software by using the previously purchased software as a kind of 'key' necessary to use the available delta files.

BRIEF DESCRIPTION OF THE DRAWINGS

An embodiment of the invention will now be described with reference to the accompanying drawing, in which:

FIG. 1 shows an extract of Java source code for a class file;

FIG. 2 shows a flattened class file for the extract of FIG. 1;

FIG. 3 shows an update of the source code extract of FIG. 1; and

FIG. 4 shows a delta file generated for the files of FIGS. 1 and 3.

DESCRIPTION OF THE PREFERRED EMBODIMENTS

The preferred embodiment of the invention operates by flattening Java class (es) files for original and updated source code. FIG. 1 shows an extract from a simple piece of Java source code including a loop which iterates 8 times. FIG. 3 shows this source code amended to cause the loop to iterate 10 times.

In the present embodiment a Java Development Kit (JDK) utility Javap is used to split the class file data stream of bytes for each source file into records, each of which represent one element of the Java class file. The flattened file for the class file corresponding to the source code of FIG. 1 is shown in FIG. 2. On line 9 of the method lookAtDate the record "bipush 8" has been generated. The flattened class file for the code of FIG. 3, only differs in that this line reads "bipush 10".

The two 'flattened' classes are then compared using tools such as text comparison tools, for example, the UNIX "diff" command.

These tools (such as diff using the switch "-e") construct a delta file between two test files rapidly and output the delta information, preferably, in the form of batch editor commands, FIG. 4, that can be used to construct the new version of the text file, FIG. 3, from the original, FIG. 1.

Typically the delta file containing such editor commands is an order of magnitude smaller than the whole of the updated class file for a typical software version to version migration. Whereas conventional updates are 'chunked' at the class level, with the present embodiment only the actual bytecodes that have been changed (plus a few other key bytes in the class file) need be communicated—the smallest possible chunks.

This delta class file of FIG. 4 is stored in the server to be pulled by the client (or possibly 'pushed' to subscribed clients).

On the client machine, the delta file is downloaded rather than the new version of the class. Then the original class file is 'flattened', the delta commands are applied and the resulting file is 'unflattened' again producing a Java class file identical to the new version on the server in a greatly reduced overall time.

A simple prototype for implementing the invention is described below. "The Java Virtual Machine Specification" Javasoft/Addison Wesley describes the class file specification. A conventional type scanner, Javap, based on the grammar described in this specification processes the class files (FIGS. 1 and 3) into respective text files containing one terminal element per line, only the text file for FIG. 1 is shown in FIG. 2.

It is acknowledged that Javap does not enable reversal of the flattening process. As such, if Javap type flattening is to be used, then a dedicated reverse utility, developed using conventional techniques, is provided. Alternative flattening utilities include the shareware Utility Mocha. Although Mocha provides flattening and reverse flattening, the flattened file includes more than one terminal element per line and so does not provide the same level of granularity for detecting updates as Javap.

In any case, the UNIX 'diff' tool with it's -e option can be applied to the flattened file to create a delta file, FIG. 3. Equivalent tools are available both in other operating systems such as "patch" on the AIX produced by IBM Corporation, or are used within conventional Revision Control Systems (RCS) or Source Code Control Systems (SCCS).

The delta file is then shipped to the client, in the present embodiment, across the Internet.

The clients original class file corresponding to the source code of FIG. 1 is then flattened and broken into a text file as shown in FIG. 2. The delta file is then applied to the flattened file of FIG. 2, to change the original flattened file to the new one in one step, using, for example, the UNIX command:

(cat delta.file; echo 'w')|ed—originalfile.class

This command does the following:

The "cat delta.file" prints out the delta file to what is termed the command pipe (or standard out). The PC equivalent is "type delta.file". The semi-colon indicates another command follows.'echo' then prints out the string "w". This will just append the w or write command to the delta file. The 'w' is an additional editor command that says (w)rite the file to disk—this saves the file back to disk.

The '|' character 'pipes' the output command pipe of it's left hand side into the input of the command on it's right (ie ed—originalfile.class) This says 'batch edit the file originalfile.class and take further commands from the standard input—in the example the standard input is 'piped in', as being 15c etc. as shown in FIG. 4 to give the new flattened class file. This file is exactly the same as the new flattened class file—but produced from the original and a smaller delta file.

The embodiment then takes the flattened class file with it's machine instructions named to reconstitute the binary equivalent.

It should also be seen that a commercial embodiment would have not need to make the flattened file of FIG. 2 so human readable so each class file byte code could be represented by a more compressed code rather than the code's 'name' (eg bipush)—so each delta line would be even smaller than the example above.

The resulting flat class file is then unflattened by reversing the original scanning and flattening process to produce the class file corresponding to the source code of FIG. 3 without any loss of content. Applications using the new class file can now be run as normal.

It should be seen that a commercial embodiment would use customised equivalents of the above tools to achieve the same effect in one operation at the client machine.

Preferably, the software for creating the update on the client machine could be built into a browser. This would operate in a similar manner to the way, for example, the "archive" switch operates with the HTML (Hyper Text Mark-up Language) "applet" tag so that classes downloaded as JAR files are automatically unjarred before being run on the client.

It will be seen that, while the present embodiment is described in terms of Java, the invention is applicable to applications written in other languages. For example, the applications could also be written as a set of ActiveX Controls possibly with a visual builder such as Microsoft Visual Studio '97. ActiveX controls, however, can contain machine code with which the invention may not as effective. This is because in machine code inserting new code causes a lot of changes in subsequent code as a lot of the byte values are relative and absolute machine addresses and these change if the position of the machine instructions changes inside the binary file.

It is the tabular internal form of a Java class file that makes the binary codes more independent from their address position that makes this invention more useful with Java—as there can be changes to the code inside the class file (for example an addition of a new variable etc) that nonetheless will leave a high proportion of the values in the flattened file unchanged. Nonetheless, the invention is applicable to such applications in a similar manner to that for Java without departing from the scope of the invention.

What is claimed is:

1. In a client computer, a method for updating a first version of installed application files to a second version, said method comprising the steps of:

responsive to receiving a delta file defining the changes between a file in said first version and a corresponding file in said second version, transforming said first version of said file into a first transformed image comprising a series of records;

applying the changes contained in said delta file to selected records of said first transformed image to generate a transformed image of said second version; and reversing the transformation on the transformed image of said second version to generate said second version of said file on said client computer.

2. A method as claimed in claim 1 wherein said client computer is connected to a server across a network and said delta file is received across said network.

3. A method as claimed in claim 2 wherein said network is the Internet and said application comprises a plurality of Java class files.

4. A method as claimed in claim 3 in which said transforming step divides said class files into respective text files containing one terminal element per line.

5. A method as claimed in claim 4 in which said delta file includes a plurality of batch editor commands, and said applying step applies said commands to selected lines of said first transformed image to generate said transformed image of said second version.

6. A component operable in a client computer for updating a first version of installed application files to a second version, said component comprising:

means, responsive to receiving a delta file defining the changes between a file in said first version and a corresponding file in said second version, adapted to transform said first version of said file into a first transformed image comprising a series of records;

means adapted to apply the changes contained in said delta file to selected records of said first transformed image to generate a transformed image of said second version; and means adapted to reverse the transformation on the transformed image of said second version to generate said second version of said file on said client computer.

7. A web browser for connecting a client computer to the Internet including the component of claim 6.

8. A computer program product comprising computer program code stored on a computer readable storage medium for, when executed on a computer, updating a first version of installed application files to a second version, the product comprising a component as claimed in claim 6.

* * * * *